(12) United States Patent
Matsen et al.

(10) Patent No.: US 10,112,229 B2
(45) Date of Patent: Oct. 30, 2018

(54) APPARATUS AND METHOD FOR FORMING THREE-SHEET PANELS

(71) Applicant: The Boeing Company, Chicago, IL (US)

(72) Inventors: Marc R. Matsen, Seattle, WA (US); David S. Nansen, Renton, WA (US); Lee C. Firth, Renton, WA (US); Gregory A. Foltz, Seattle, WA (US)

(73) Assignee: The Boeing Company, Chicago, IL (US)

( * ) Notice: Subject to any disclaimer, the term of this patent is extended or adjusted under 35 U.S.C. 154(b) by 473 days.

(21) Appl. No.: 14/827,711

(22) Filed: Aug. 17, 2015

(65) Prior Publication Data

US 2017/0050229 A1    Feb. 23, 2017

(51) Int. Cl.

| | |
|---|---|
| *B21D 26/031* | (2011.01) |
| *B21D 37/16* | (2006.01) |
| *H05B 6/10* | (2006.01) |
| *B21D 26/029* | (2011.01) |
| *B21D 26/055* | (2011.01) |
| *B21D 26/059* | (2011.01) |
| *B21D 47/02* | (2006.01) |
| *B21D 47/04* | (2006.01) |
| *B32B 15/01* | (2006.01) |

(52) U.S. Cl.
CPC ......... *B21D 26/031* (2013.01); *B21D 26/029* (2013.01); *B21D 26/055* (2013.01); *B21D 26/059* (2013.01); *B21D 37/16* (2013.01); *B21D 47/02* (2013.01); *B21D 47/04* (2013.01); *B32B 15/01* (2013.01); *B32B 15/011* (2013.01); *H05B 6/105* (2013.01)

(58) Field of Classification Search
CPC .................................................... B21D 47/02
See application file for complete search history.

(56) References Cited

U.S. PATENT DOCUMENTS

| | | | | |
|---|---|---|---|---|
| 3,920,175 | A | * | 11/1975 | Hamilton ............. B21D 26/055 228/173.2 |
| 4,181,000 | A | * | 1/1980 | Hamilton ............. B21D 26/055 72/364 |
| 5,530,227 | A | | 6/1996 | Matsen et al. |
| 5,645,744 | A | | 7/1997 | Matsen et al. |
| 5,683,608 | A | | 11/1997 | Matsen et al. |
| 5,728,309 | A | | 3/1998 | Matsen et al. |
| 6,180,932 | B1 | | 1/2001 | Matsen et al. |
| 6,914,225 | B2 | | 7/2005 | Fischer et al. |
| 2007/0102494 | A1 | * | 5/2007 | Connelly ............. B21D 26/055 228/157 |

FOREIGN PATENT DOCUMENTS

| | | |
|---|---|---|
| EP | 0 507 067 A2 | 10/1992 |
| EP | 1 957 216 B1 | 7/2009 |

OTHER PUBLICATIONS

European Patent Office, Extended European Search Report, Application No. 16171313.6-1702, (dated Jan. 17, 2017).

* cited by examiner

*Primary Examiner* — Christopher M Rodd

(74) *Attorney, Agent, or Firm* — Walters & Wasylyna LLC

(57) ABSTRACT

An apparatus for forming a panel, including a first face sheet, a second face sheet and a core sheet between the first face sheet and the second face sheet, may include a molding tool defining a forming cavity shaped to correspond to the panel, a heating system positioned adjacent to the forming cavity and configured to heat the forming cavity, and a pressurization system configured to pressurize a cavity volume between the tool and the panel and pressurize a panel volume between the first face sheet and the second face sheet.

20 Claims, 10 Drawing Sheets

APPARATUS AND METHOD FOR FORMING THREE-SHEET PANELS

FIELD

The present disclosure is generally related to multi-sheet panel formation and, more particularly, to apparatus and methods for making panels of three sheets of material using a Superplastic Forming process.

BACKGROUND

Superplastic Forming ("SPF") is a material forming process designed for sheet material allowing elongation of several hundred percent. Common materials used with SPF include, but are not limited to, aluminum alloys, titanium alloys, and nickel alloys. The material is heated to promote superplasticity. In a superplastic state, the material is sufficiently pliable so processes that are usually used on plastics may be applied, such as thermoforming, blow forming, vacuum forming and the like.

SPF may be used to create multi-sheet panels (a panel formed of two or more sheets of material). In a two-sheet panel example, two metal sheets are welded together and placed within a molding tool. In a three-sheet panel (a panel formed of a core sheet and two opposing face sheets sandwiching the core sheet) example, the core sheet is welded to the face sheets and placed within the molding tool. When the panel is hot, a pressure is applied, for example, between the two sheets of the two-sheet panel of between the face sheets and the core of the three-sheet panel, and the panel becomes hollow to the form of the molding tool.

Disadvantageously, a multi-sheet panel formed this way has a propensity to exhibit surface imperfections (e.g., "dimpling" or "eyebrowing") during the SPF process. During the SPF process, pulling stresses applied on a sheet by an adjacent sheet may cause such imperfections. Such imperfections often occur when making three-sheet panels using the SPF process. These imperfections may adversely affect the characteristics (e.g., the aerodynamic characteristics and/or the structural characteristics) of the panel. Thus, current manufacturing techniques, such as SPF, may not be suitable for making panels from three sheets of material.

One alternative used to provide some relief from the formation of surface imperfections (e.g., the dimpling effect) on three-sheet panels is to make the face sheets much thicker than the core sheet. However, this solution comes with an increase in weight and a rather severe performance penalty.

Another alternative is to make a four-sheet panel. The four-sheet panel may not form dimples when the face sheets are forced apart because there are no welds between the core and face sheets. Formation of four-sheet panels combines SPF with a second element, Diffusion Bonding, also known as Superplastic forming and diffusion bonding ("SPF/DB"), to create a panel formed of four sheets of material. Generally, the four metal sheets are welded together (e.g., at their edges) and heated within the confines of a molding tool. When the panel is hot, a pressure is applied between the sheets and the panel becomes hollow to the form of the molding tool. However, since diffusion bonding is used to join the sheets, such bonding may take many hours to form.

Accordingly, three-sheet panels are preferred over four-sheet panels because the three-sheet panels are lighter (three sheets vs. four sheets) and quicker to make (no diffusion bonding). However, three-sheet panels are not currently used because there are no suitable manufacturing techniques for making such panels.

Accordingly, those skilled in the art continue with research and development efforts in the field of three-sheet panel manufacturing.

SUMMARY

In one embodiment, the disclosed apparatus for forming a panel, including a first face sheet, a second face sheet and a core sheet between the first face sheet and the second face sheet, may include a molding tool defining a forming cavity shaped to correspond to the panel, a heating system positioned adjacent to the forming cavity and configured to heat the forming cavity, and a pressurization system configured to pressurize a cavity volume between the tool and the panel and pressurize a panel volume between the first face sheet and the second face sheet.

In another embodiment, the disclosed method for forming a panel, including a first face sheet, a second face sheet and a core sheet between the first face sheet and the second face sheet, may include the steps of: (1) entrapping a precursor panel within a forming cavity of a molding tool, the precursor panel including the first face sheet, the core sheet welded to the first face sheet and the second face sheet welded to the core sheet, (2) heating the precursor panel to a superplastic temperature, (3) pressurizing a cavity volume defined between the tool and the precursor panel, and (4) pressurizing a panel volume defined between the first face sheet and the second face sheet of the precursor panel In yet another embodiment, the disclosed panel may include a first face sheet, a second face sheet spaced apart from the first face sheet, and a core sheet intercoupled between the first face sheet and the second face sheet, wherein the panel is formed from a heated precursor panel by applying an internal pressure to an interior of the first face sheet and the second face sheet to push the first face sheet and the second face sheet apart from each other and by applying an external pressure to an exterior of the first face sheet and the second face sheet to prevent surface imperfections, and wherein the internal pressure is greater than the external pressure.

Other embodiments of the disclosed apparatus and method will become apparent from the following detailed description, the accompanying drawings and the appended claims.

DETAILED DESCRIPTION

Figure 1:
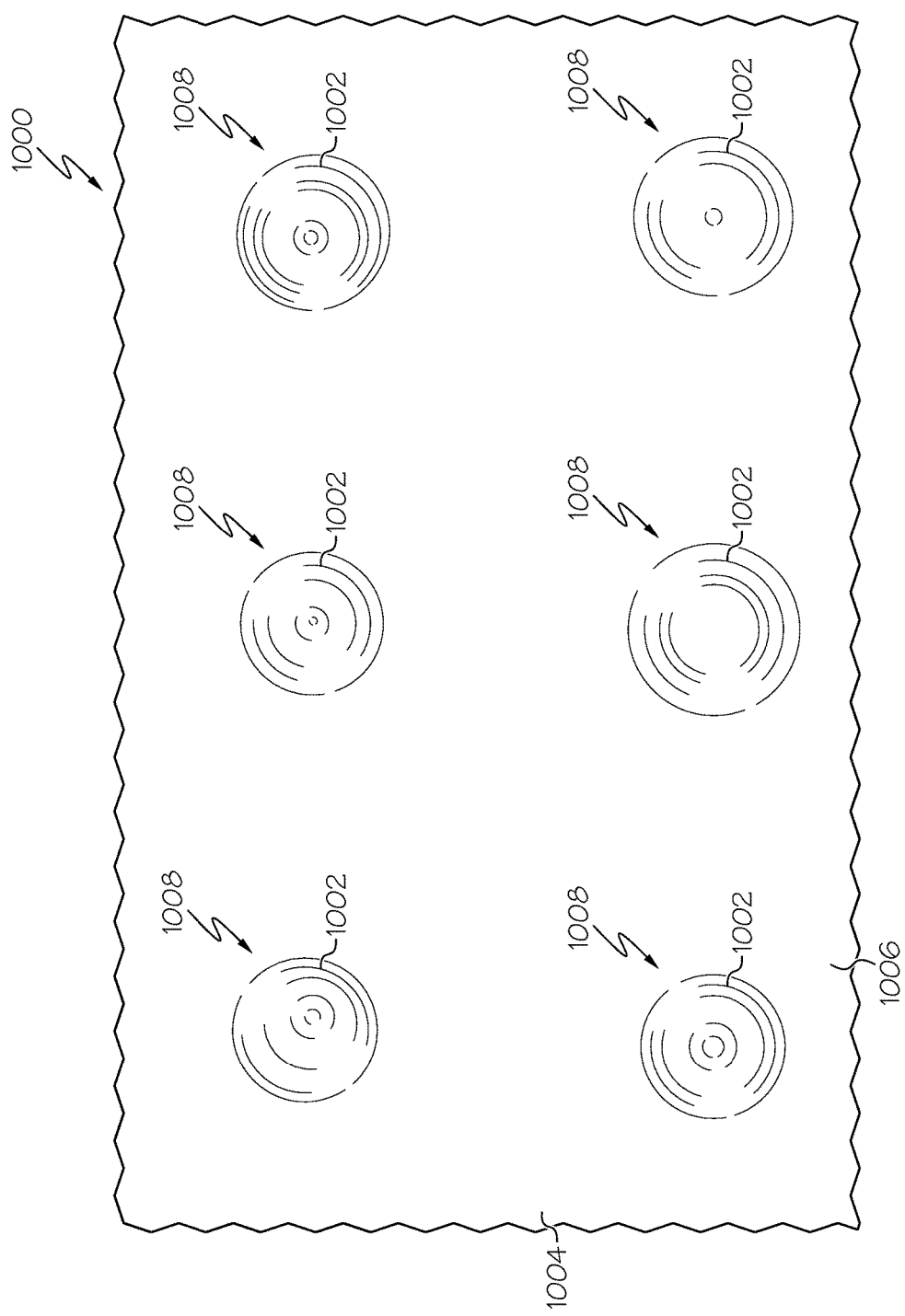
FIG. 1 is a plan view of a three-sheet panel illustrating surface imperfections created during a manufacturing process.

The following detailed description refers to the accompanying drawings, which illustrate specific embodiments of the disclosure. Other embodiments having different structures and operations do not depart from the scope of the present disclosure. Like reference numerals may refer to the same element or component in the different drawings.

Figure 2:
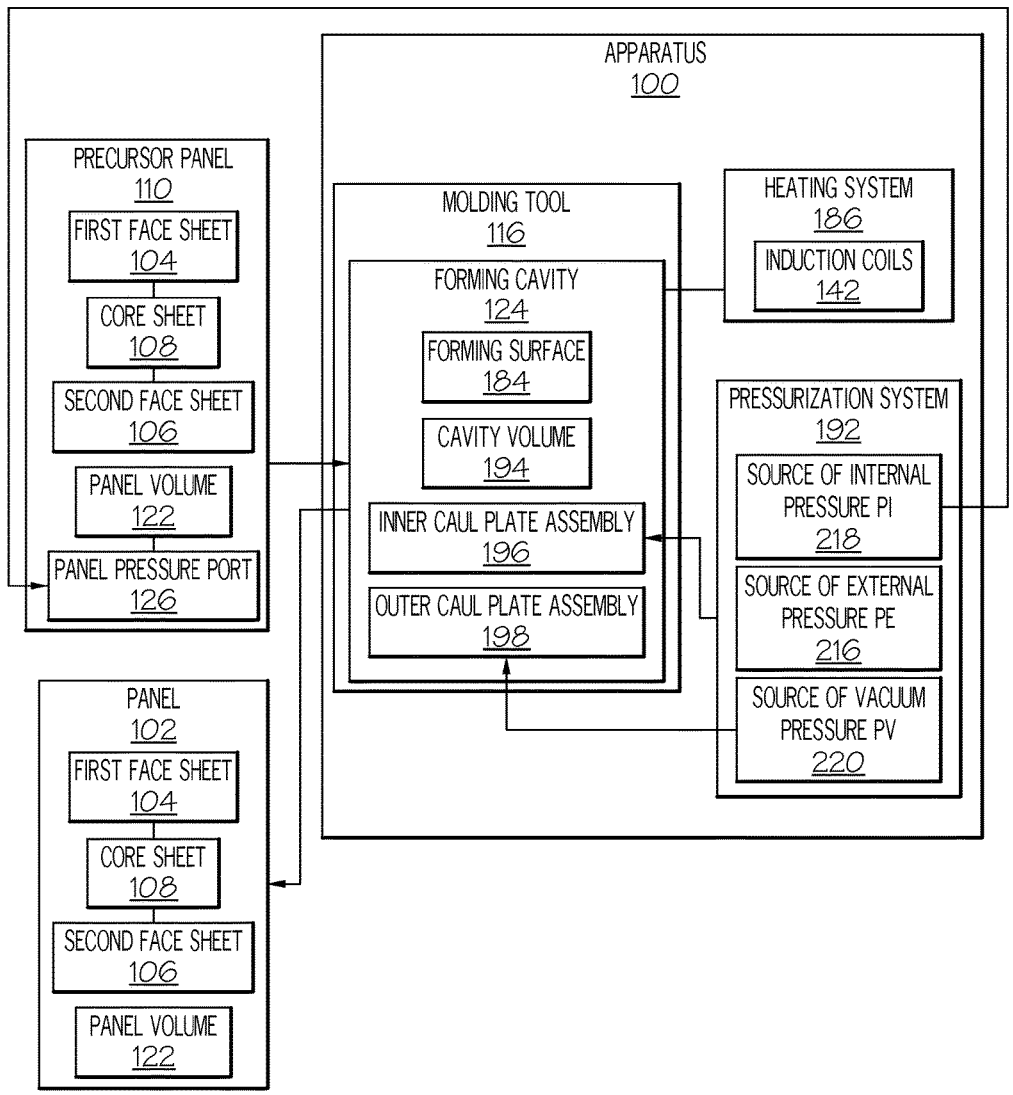
FIG. 2 is a schematic block diagram of one embodiment of the disclosed apparatus for forming a three-sheet panel.
Figure 12:
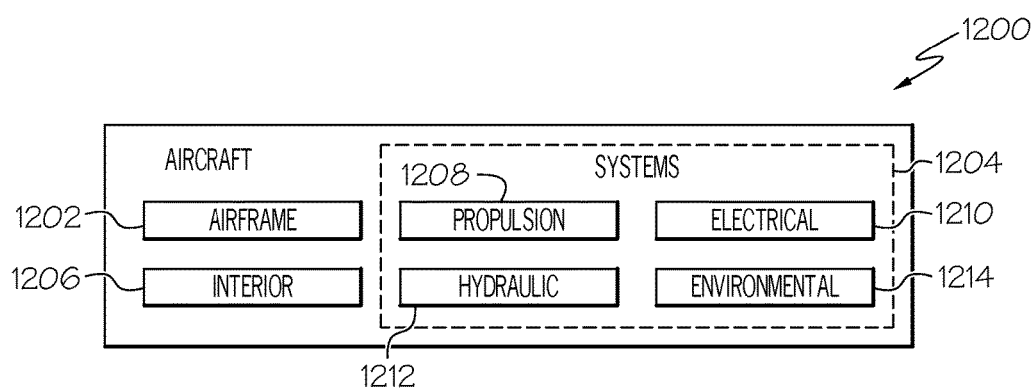
FIG. 12 is a schematic illustration of an aircraft.

In FIGS. 2 and 12, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIGS. 2 and 12 may be combined in various ways without the need to include other features described in FIGS. 2 and 12, other drawing figures, and/or the accompanying disclosure, even though such combination or combinations are not explicitly illustrated herein. Similarly, additional features not limited to the examples presented, may be combined with some or all of the features shown and described herein.

Figure 10:
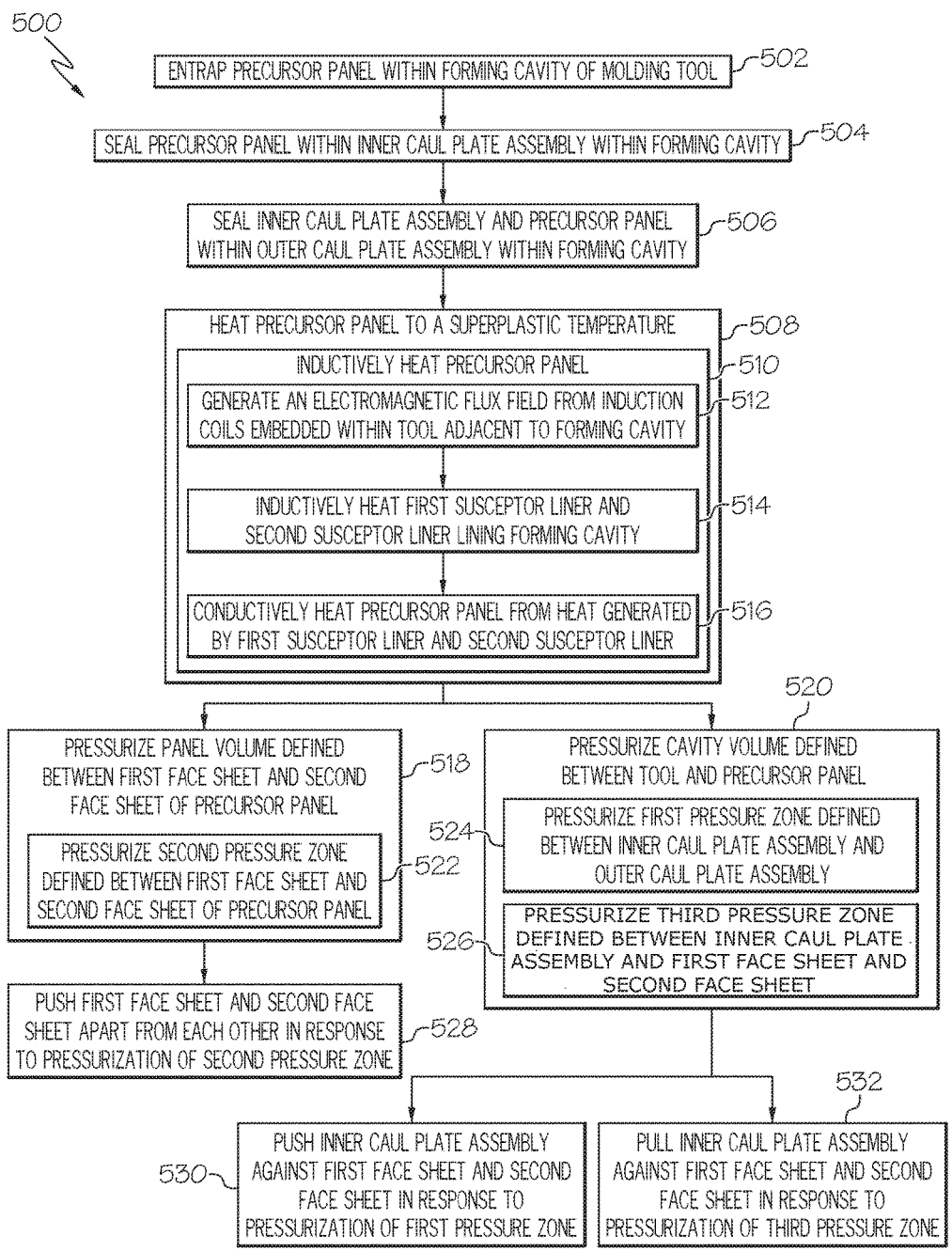
FIG. 10 is a flow diagram of one embodiment of the disclosed method for forming the panel of FIG. 2.
Figure 11:
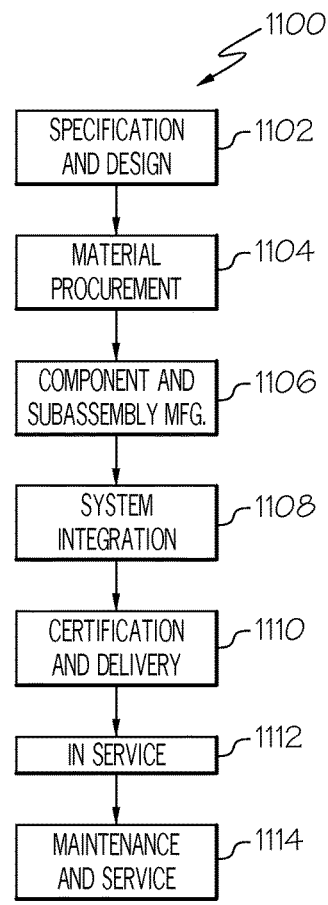
FIG. 11 is a block diagram of aircraft production and service methodology.

In FIGS. 10 and 11, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 10 and 11 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

Reference herein to "example" means that one or more feature, structure, or characteristic described in connection with the example is included in at least one embodiment or implementation. The phrase "one example" or "another example" in various places in the specification may or may not be referring to the same example.

Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

The present disclosure recognizes that multi-sheet panels (e.g., panels formed of two or more sheets of material) may be formed using a Superplastic Forming ("SPF") process. As one example, the SPF process may be used to make three-sheet panels. Three-sheet panels are formed of a core sheet and two opposing face sheets sandwiching the core sheet. In a three-sheet panel, the core sheet is welded to the face sheets. After the sheets are welded together, the sheets are heated and a volume between the face sheets is pressurized to force the face sheets apart from the core sheet.

As illustrated in FIG. 1, the present disclosure further recognizes that current SPF processes are not suitable for making three-sheet panels 1000 due to the formation of imperfections 1002 (e.g., dimples) on surface 1004 of three-sheet panel 1000. Pulling stresses applied on the face sheets 1006 by the core sheet (not illustrated in FIG. 1) may cause such imperfections 1002 to occur. As the face sheets 1006 pull apart, the core sheet bends and the face sheets 1006 pillow out around welds 1008, thereby forming sharp dimples (e.g., imperfections 1002) in the outer surfaces 1004 of the face sheets 1006.

The present disclosure further recognizes that three-sheet panels can attenuate noise, carry a structural load, and are attractive from a cycle time and weight perspective but need to be free of surface imperfections (e.g., imperfections 1002) (FIG. 1) for these advantages to be realized. Further, three-sheet panels may be used as a substitute for honeycomb core panels (e.g., panels formed of a honeycomb core and two opposing face sheets sandwiching the honeycomb core). As one example, three-sheet panels may have a particularly beneficial use in the aerospace industry as a substitute for honeycomb core panels.

Figure 3:
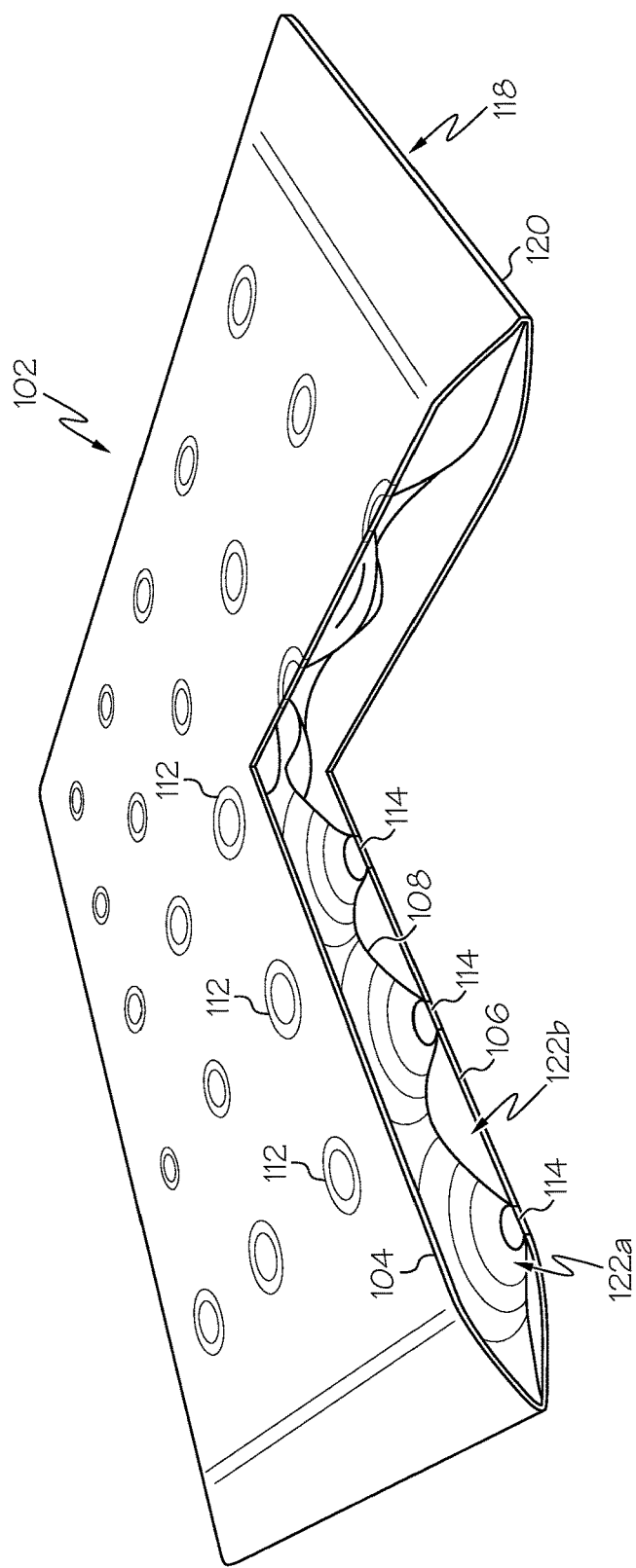
FIG. 3 is a schematic perspective view of one embodiment of the panel of FIG. 2.

Referring to FIG. 3, and with reference to FIG. 2, one embodiment of panel 102, is disclosed. Panel 102 may be formed using apparatus 100 (FIG. 2) and method 500 (FIG. 10). Panel 102 includes first face sheet 104, second face sheet 106 and core sheet 108 intercoupled between first face sheet 104 and second face sheet 106. First face sheet 104 and second face sheet 106 are spaced apart from each other. Panel 102 may be generally referred to as a three-sheet panel. Panel 102 is stiff and lightweight.

Figure 4:
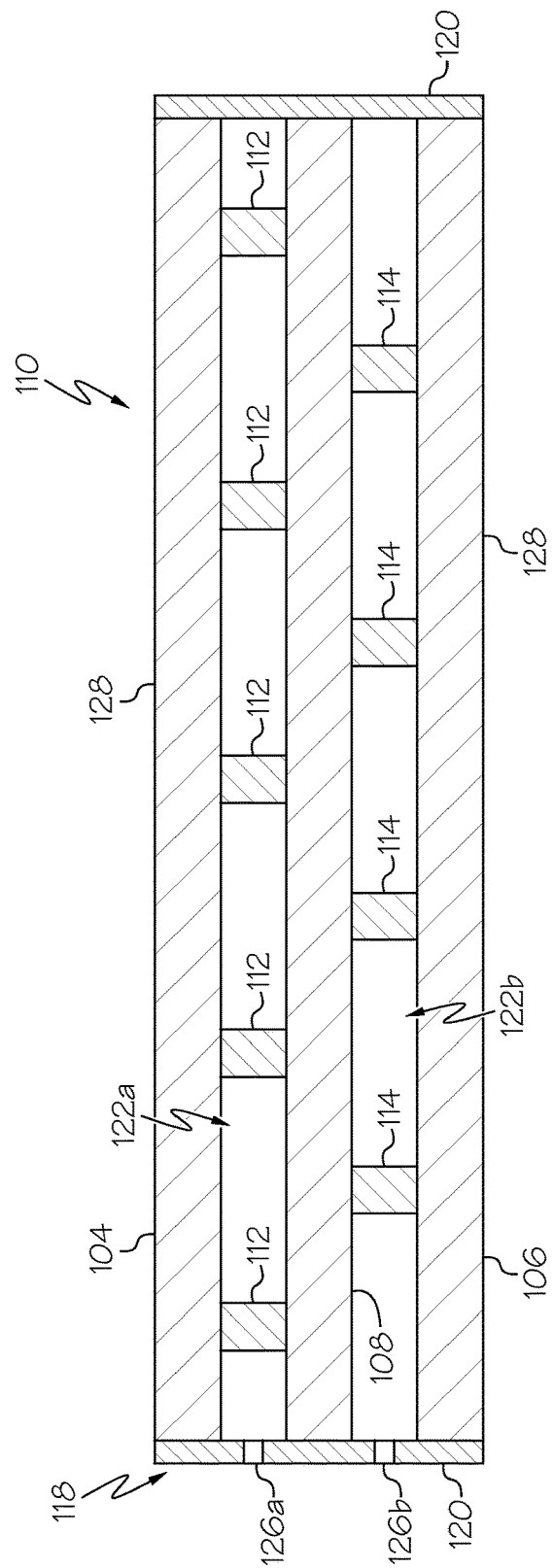
FIG. 4 is a schematic side elevation view, in cross-section, of one embodiment of the precursor panel of FIG. 2.

Referring to FIGS. 3 and 4, as one example, panel 102 (FIG. 3) is formed from precursor panel 110 (FIG. 4). Generally, precursor panel 110 is heated and pressurized to form panel 102. As will be described in greater detail herein, as one example, precursor panel 110 may be inflated with an inert gas using a tailored inert gas pressure profile 130 (FIGS. 8 and 9) to superplastically form panel 102 from a heated precursor panel 110.

First face sheet 104 is welded to core sheet 108 by a plurality of first welds 112 (e.g., weld joints). Core sheet 108 is welded to second face sheet 106 by a plurality of second welds 114 (e.g., weld joints). First welds 112 and second welds 114 may be partial penetration welds. Core sheet 108 is welded to face sheets 104, 106 such that half the welds (e.g., first welds 112) are between first face sheet 104 and the core sheet 108 and the other half of the welds (e.g., second welds 114) are between the opposed second face sheet 106 and core sheet 108. First welds 112 may be aligned with each other and form a grid of first welds 112. Second welds 114 may be aligned with each other and from a grid of second welds 114. First welds 112 and second welds 114 are offset from each other.

Referring to FIG. 4, in one example of precursor panel 110, first face sheet 104, second face sheet 106 and core sheet 108 are flat and parallel to each other. The welded stack of first face sheet 104, core sheet 108 and second face sheet 106 forms a sandwich structure. The sandwich structure is welded along peripheral edge 118 (e.g., common peripheral edges of first face sheet 104, core sheet 108 and second face sheet 106) by third weld 120 (e.g., weld joint) to form precursor panel 110.

In the example precursor panel 110 illustrated in FIG. 4, the cross-sectional thickness of first face sheet 104, second face sheet 106 and core sheet 108; the cross-sectional thickness of the welds (e.g., first welds 112, second welds 114 and third weld 120); and the distance between first face sheet 104 and core sheet 108 and second face sheet 106 and core sheet 108 relative to the cross-sectional thicknesses of first face sheet 104, core sheet 108 and second face sheet 106 are exaggerated for clarity and illustration.

Referring to FIG. 2, and with reference to FIG. 4, a volume between first face sheet 104 and second face sheet 106 defines panel volume 122. Panel pressure port 126 is formed through precursor panel 110 to pressurize panel volume 122. As one example, panel pressure port 126 is formed through peripheral edge 118 (FIG. 4) of precursor panel 110.

Referring to FIG. 4, and with reference to FIG. 2, as one example, panel volume 122 (FIG. 2) may include first panel volume 122a defined by the volume between first face sheet 104 and core sheet 108 and second panel volume 122b defined by the volume between second face sheet 106 and core sheet 108. Panel pressure port 126 (FIG. 2) may include first panel pressure port 126a to pressurize first panel volume 122a and second panel pressure port 126b to pressurize second panel volume 122b.

While the example precursor panel 110 of FIG. 4 is illustrated having two panel pressure ports 126 (e.g., first panel pressure port 126a in fluid communication with first panel volume 122a and second panel pressure port 126b in fluid communication with second panel volume 122b), alternatively, a single panel pressure port 126 in fluid communication with the entire panel volume 122 (e.g., both first panel volume 122a and second panel volume 122b) may also be used. As another alternative, a plurality of panel pressure ports 126 in fluid communication with panel volume 122 may also be used.

Referring to FIGS. 3 and 4, after sheets 104, 106 and 108 (first face sheet 104, second face sheet 106 and core sheet 108) are welded together to form precursor panel 110 (FIG. 4), precursor panel 110 (e.g., welded sheets 104, 106 and 108) is heated and panel volume 122 between first face sheet 104 and second face sheet 106 is pressurized to expand panel volume 122 and force first face sheet 104 and second face sheet 106 apart from each other to form panel 102 (FIG. 3). Since first welds 112 and second welds 114 are offset, core sheet 108 is shaped into alternating parallel ridges and grooves (e.g., forms a corrugated core sheet) when first face sheet 104 and second face sheet 106 are forced apart from each other, as illustrated in FIG. 3.

Figure 5:
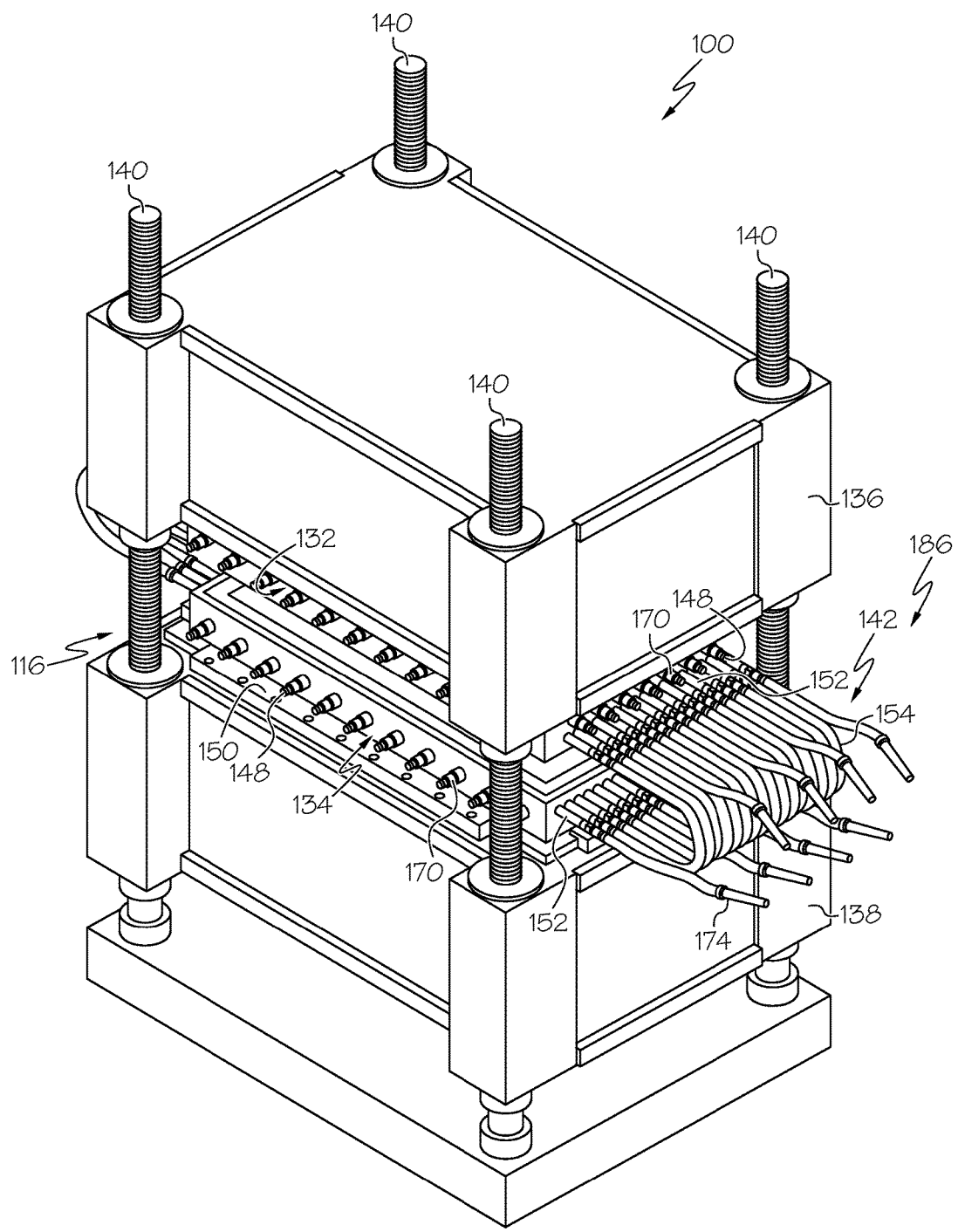
FIG. 5 is a schematic perspective view of one embodiment of the apparatus of FIG. 2.

Referring to FIG. 2, and with reference to FIG. 5, also disclosed is one embodiment of apparatus 100 for forming panel 102. Apparatus 100 includes molding tool 116 defining forming cavity 124 (FIG. 2) shaped to correspond to panel 102 (FIG. 2). As one example, at least a portion of forming cavity 124 includes a shape corresponding to the final molded shape of panel 102 following pressurization of panel volume 122 (FIG. 2). Tool 116 includes forming surface 184 having a shape corresponding to the desired shape of panel 102.

Apparatus 100 includes heating system 186 positioned adjacent to forming cavity 124 and configured to heat forming cavity 124. Heating system 186 is configured to heat precursor panel 110 (FIG. 2) positioned within forming cavity 124 prior to pressurization of panel volume 122. Heating system 186 may be embedded within tool 116.

Apparatus 100 includes pressurization system 192 (FIG. 2) configured to pressurize cavity volume 194 (FIG. 2). A volume between tool 116 and first face sheet 104 and a volume between tool 116 and second face sheet 106 define cavity volume 194. Pressurization system 192 is configured to pressurize panel volume 122. As illustrated in FIGS. 3 and 4, the volume between first face sheet 104 and second face sheet 106 defines panel volume 122.

Figure 6:
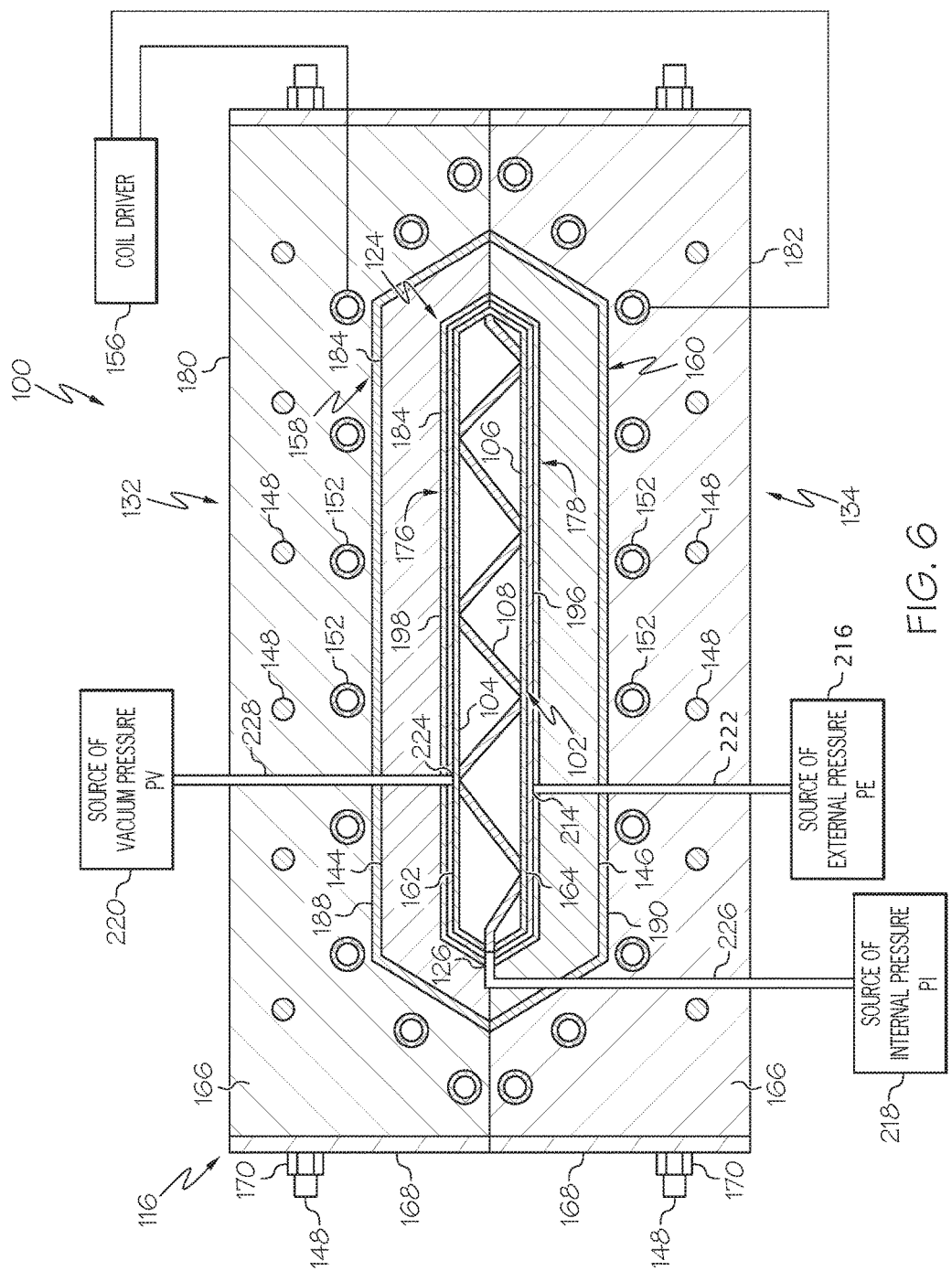
FIG. 6 is a schematic side elevation view, in cross-section, of the apparatus of FIG. 2 shown with the formed panel of FIG. 3.

Referring to FIG. 5, and with reference to FIGS. 2 and 6, in one example construction, tool 116 includes two halves and forming cavity 124 (FIG. 2) is defined between the two halves. As one example, tool 116 includes first (e.g., upper) tool 132 and second (e.g., lower) tool 134. First tool 132 and second tool 134 in combination define forming cavity 124. At least a portion of forming cavity 124 is shaped to correspond to panel 102 (FIG. 2) formed using apparatus 100. First tool 132 and second tool 134 each define at least a portion of forming cavity 124. As one example, first tool 132 defines first (e.g., upper) portion 176 (FIG. 6) of forming cavity 124 and second tool 134 defines second (e.g., lower) portion 178 (FIG. 6) of forming cavity 124. First tool 132 may include first forming surface 162 (FIG. 6) having a shape corresponding to the desired shape of first face sheet 104 of panel 102 and second tool 134 may include second forming surface 164 (FIG. 6) having a shape corresponding to the desired shape of second face sheet 106 of panel 102.

First tool 132 and second tool 134 may be mounted to or within first (e.g., upper) strongback 136 and second (e.g., lower) 138 strongback, respectively. In one example construction, first strongback 136 and second strongback 138 are each threaded onto four threaded column supports, for example, jackscrews 140. Jackscrews 140 can be turned using a bellows or other actuation mechanisms to move first strongback 136 or second strongback 138 up or down in relation to each other. Movement of first strongback 136 and second strongback 138 move respective first tool 132 and second tool 134 up or down in relation to each other to form forming cavity 124.

As one example, first strongback 136 and second strongback 138 each includes a rigid, flat backing surface (not explicitly illustrated) for first tool 132 and second tool 134, respectively, to prevent bending and/or cracking of first tool 132 and second tool 134 during repeated panel-forming operations. First strongback 136 and second strongback 138 may be capable of holding first tool 132 and second tool 134 to a surface tolerance of approximately ±0.003 inches per square foot (approximately ±0.82 millimeters per square meter) of the forming surface in the tool 116 (e.g., defining forming cavity 194). Such tolerances may help to insure that proper part tolerances are achieved. First strongback 136 and second strongback 138 may be formed of steel, aluminum, or any other material capable of handling the loads present during panel forming. However, in certain embodiments, materials that are nonmagnetic, such as aluminum or some steel alloys, may be preferred to avoid any distortion to the magnetic field produced by induction coils 142, as described below. In some circumstances, first tool 132 and/or second tool 134 may be strong enough for panel forming without first strongback 136 and/or second strongback 138.

First tool 132 and second tool 134 each may be attached to its respective first strongback 136 and second strongback 138 by any suitable fastening devices, such as bolting or clamping. As one example, both first tool 132 and second tool 134 are mounted on support plates 150 (only a lower support plate 150 coupled to second tool 134 is shown in FIG. 5) that are held in place on the respective first strongback 136 and second strongback 138, for example, through the use of clamping bars (not explicitly illustrated). The clamping bars may extend around the peripheral edges of support plates 150 and be bolted to the respective first strongback 136 and second strongback 138 through the use of fasteners (not explicitly illustrated).

Referring to FIG. 6, in one example construction, first tool 132 includes first (e.g., upper) die 180 and second tool 134 includes second (e.g., lower) die 182. First tool 132 includes first (e.g., upper) insert 144 coupled to first die 180 and second tool 134 includes second (e.g., lower) insert 146 coupled to second die 182. As one example, first (e.g., upper) insert cavity 158 formed in first die 180 is sized to hold first insert 144 and second (e.g., lower) insert cavity 160 formed in second die 182 is sized to hold second insert 146.

Forming cavity 124 is defined between first insert 144 and second insert 146. At least a portion of forming cavity 124 is shaped to correspond to panel 102 (FIG. 2) formed using apparatus 100. First insert 144 and second insert 146 each define at least a portion of forming cavity 124. As one example, first insert 144 defines first portion 176 of forming cavity 124 and second insert 146 defines second portion 178 of forming cavity 124. Forming surface 184 may be defined by first insert 144 and second insert 146. As one example, first insert 144 may define a first portion of forming surface 184 having a shape generally corresponding to the desired shape of one side of panel 102 (e.g., side of panel 102 defined by first face sheet 104) and second insert 146 may define a second portion of forming surface 184 having a shape generally corresponding to the desired shape of an opposed side of panel 102 (e.g., side of panel 102 defined by second face sheet 106). Forming surface 184 may be flat or contoured.

Alternatively, first insert 144 and second insert 146 each may be formed as an integral part of respective first die 180 and second die 182. The separate die and insert configuration of the tools may be preferable because it allows different inserts, for example, defining different shaped forming cavities, to be used in the same tools, simplifying the replacement task for changing the tooling and reducing the tooling costs. Further, the separate die and insert configuration of the tools may allow for the use of susceptor liners 188 and 190, as described in greater detail below.

Figure 7:
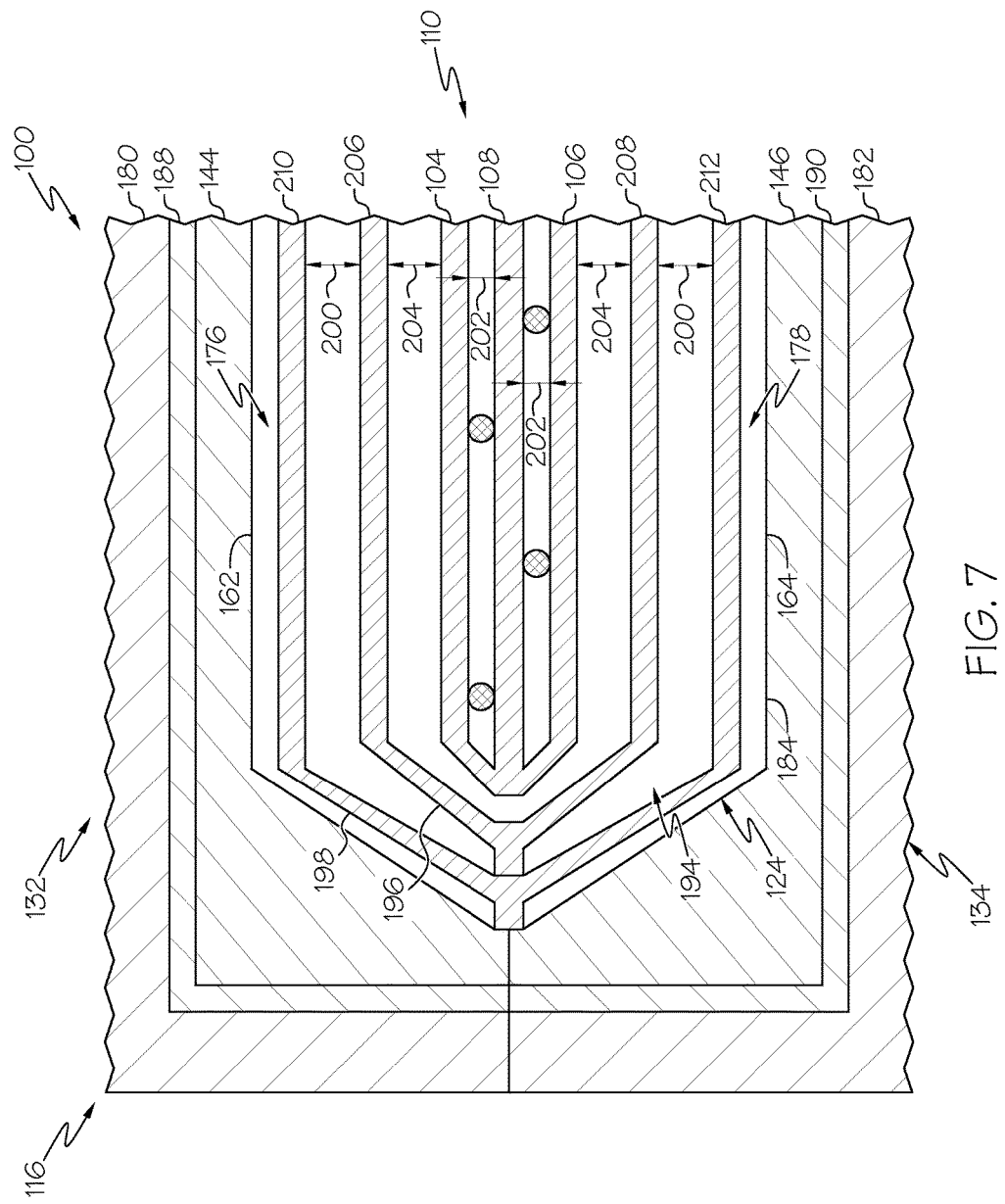
FIG. 7 is a schematic side elevation view, in cross-section, of the apparatus of FIG. 2 shown with the precursor panel of FIG. 4.

Referring to FIGS. 6 and 7, and with reference to FIG. 2, in one example, apparatus 100 includes inner caul plate assembly 196 and outer caul plate assembly 198. Outer caul plate assembly 198 is positioned within forming cavity 124 adjacent to tool 116. Inner caul plate assembly 196 is positioned within forming cavity 124 between outer caul plate assembly 198 and panel 102.

FIG. 7 illustrates one example of apparatus 100 and precursor panel 110 prior to the pressurization step of the panel-forming process. FIG. 6 illustrates one example of apparatus 100 and panel 102 following the pressurization step or steps of the panel-forming process.

Referring to FIGS. 6 and 7, and with reference to FIG. 2, during the pressurization step or steps of the panel-forming process, pressurization system 192 (FIG. 2) is configured to pressurize first pressure zone 200 (FIG. 7). First pressure zone 200 is defined between inner caul plate assembly 196 and outer caul plate assembly 198. As one example, pressurization system 192 applies external pressure $P_E$ (e.g., a pressure external to precursor panel 110 or panel 102) to first pressure zone 200. Pressurization of first pressure zone 200 (e.g., with external pressure $P_E$) pressurizes cavity volume 194, pushes outer caul plate assembly 198 in contact with forming surface 184 (FIG. 2), pushes inner caul plate assembly 196 away from outer caul plate assembly 198, and presses inner caul plate assembly 196 in contact with exterior surfaces 128 (FIG. 4) of first face sheet 104 and second face sheet 106, as illustrated in FIG. 6.

Pressurization system 192 is configured to pressurize second pressure zone 202. Second pressure zone 202 is defined between first face sheet 104 and second face sheet 106 of panel 102 (or precursor panel 110). As one example, pressurization system 192 applies internal pressure $P_I$ (e.g., a pressure internal to precursor panel 110 or panel 102) to second pressure zone 202. Pressurization of second pressure zone 202 (e.g., with internal pressure $P_I$) pressurizes panel volume 122 (FIG. 2) and pushes first face sheet 104 and second face sheet 106 apart, as illustrated in FIG. 6.

Pressurization system 192 is configured to pressurize third pressure zone 204. Third pressure zone 204 is defined between inner caul plate assembly 196 and first face sheet 104 and second face sheet 106 of panel 102 (or precursor panel 110). As one example, pressurization system 192 applies vacuum pressure $P_V$ to third pressure zone 204. Pressurization of third pressure zone 204 (e.g., with vacuum pressure $P_V$) pulls inner caul plate assembly 196 into contact with first face sheet 104 and second face sheet 106, as illustrated in FIG. 6.

Referring to FIG. 7, and with reference to FIG. 6, in one example construction, inner caul plate assembly 196 includes first (e.g., upper) inner caul plate 206 and second (e.g., lower) inner caul plate 208. First inner caul plate 206 and second inner caul plate 208 are sealed, for example, about a periphery, to seal (e.g., encapsulate or form an envelope around) panel 102 (or precursor panel 110). Inner caul plate assembly 196 includes inner caul plate pressurization port 224 (FIG. 6) to pressurize third pressure zone 204 (FIG. 7).

Outer caul plate assembly 198 includes first (e.g., upper) outer caul plate 210 and second (e.g., lower) outer caul plate 212. First outer caul plate 210 and second outer caul plate 212 are sealed, for example, about a periphery, to seal (e.g., encapsulate or form an envelope around) inner caul plate assembly 196 and panel 102 (or precursor panel 110). Outer caul plate assembly 198 includes outer caul plate pressurization port 214 (FIG. 6) to pressurize first pressure zone 200 (FIG. 7).

As illustrated in FIG. 6, upon pressurization of first pressure zone 200 (FIG. 7), first outer caul plate 210 is forced (e.g., pushed by external pressure $P_E$) against forming surface 184 defined by first insert 144 and second outer caul plate 212 is pushed against forming surface 184 defined by second insert 146.

Upon pressurization of first pressure zone 200, first inner caul plate 206 is forced (e.g., pushed by external pressure $P_E$) against exterior surface 128 (FIG. 4) of first face sheet 104 of precursor panel 110 (FIG. 7) and second inner caul plate 208 is forced (e.g., pushed by external pressure $P_E$) against exterior surface 128 of second face sheet 106 of precursor panel 110.

Upon pressurization of third pressure zone 204 (FIG. 7), first inner caul plate 206 is forced (e.g., pulled by vacuum pressure $P_V$) against exterior surface 128 of first face sheet 104 of precursor panel 110 (FIG. 7) and second inner caul plate 208 is forced (e.g., pulled by vacuum pressure $P_V$) against exterior surface 128 of second face sheet 106 of precursor panel 110.

Upon pressurization of second pressure zone 202 (FIG. 7), first face sheet 104 and second face sheet 106 are forced (e.g., pushed by internal pressure $P_I$) apart from each other.

During the pressurization steps of the panel-forming process, a pressure of second pressure zone 202 (e.g., of internal pressure $P_I$) is greater than a pressure of first pressure zone 200 (e.g., of external pressure $P_E$) to allow expansion of panel volume 122 (FIG. 2) and first face sheet 104 and second face sheet 106 to push apart from each other while inner caul plate assembly 196 exerts a force upon first face sheet 104 and second face sheet 106.

The pressure of first pressure zone 200 (e.g., of external pressure $P_E$), and a pressure of third pressure zone 204 (e.g., of vacuum pressure $P_V$), forces inner caul plate assembly 196 (e.g., first inner caul plate 206 and second inner caul plate 206) against exterior surface 128 of first face sheet 104 and second face sheet 106 as precursor panel 110 is expanded to form panel 102. First inner caul plate 206 stiffens (essentially thickening) first face sheet 104 and second inner caul plate 206 stiffens (essentially thickening) second face sheet 106, thus reducing or eliminating the formation of surface imperfections (e.g., about welds) created during expansion of panel volume 122 (e.g., as first face sheet 104 and second face sheet 106 are forces apart).

Thus, once first inner caul plate 206 is in contact with first face sheet 104, first inner caul plate 206 defines first forming surface 162 shaped to correspond to a formed shape of first face sheet 104 of panel 102, as illustrated in FIG. 6. Once second inner caul plate 208 is in contact with second face sheet 106, second inner caul plate 208 defines second forming surface 164 shaped to correspond to a formed shaped of second face sheet 106 of panel 102, as illustrated in FIG. 6.

First forming surface 162 defined by first inner caul panel 206 holds first face sheet 104 in a flat or planar configuration in order to prevent and/or eliminate the formation of surface imperfections (e.g., dimpling) in exterior surface 128 of first face sheet 104, for example, around first welds 112. Similarly, second forming surface 164 defined by second inner caul panel 208 holds second face sheet 106 in a flat or planar configuration in order to prevent and/or eliminate the formation of surface imperfections (e.g., dimpling) in exterior surface 128 of second face sheet 106, for example, around second welds 114. First forming surface 162 and/or second forming surface 164 may be flat or contoured depending upon the final desired formed shape of panel 102.

Inner caul plate assembly 196 and/or outer caul plate assembly 198 may be disposable after each panel-forming process. Alternatively, inner caul plate assembly 196 and/or outer caul plate assembly 198 may be reusable for numerous panel-forming processes.

Referring to FIG. 6, and with reference to FIG. 2, pressurization system 192 (FIG. 2) includes source 216 of external pressure $P_E$, source 218 of internal pressure $P_I$ and source 220 of vacuum pressure $P_V$ (FIG. 6). Source 216 of external pressure $P_E$ and/or source 218 of internal pressure $P_I$ may be pressurized gas. As one example, source 216 of external pressure $P_E$ and/or source 218 of internal pressure $P_I$ may be a pressurized inert gas (e.g., argon). Other pressurizing components, such as a pump (not explicitly illustrated) may also be used with pressurization system 192 to apply the gas pressure within first pressure zone 200 and/or second pressure zone 202 (FIG. 7). Source 220 of vacuum pressure $P_V$ (FIG. 6) may be a vacuum pump (not explicitly illustrated).

Referring to FIG. 6, source 216 of external pressure $P_E$ provides pressure (e.g., gas pressure) to first pressure zone 200 through first conduit 222. First conduit 222 may pass through second die 182 and second insert 146, as illustrated in FIG. 6, or may pass through first die 180 and first insert 144. First conduit 222 is coupled to and in fluid communication with inner caul plate assembly pressurization port 214.

Source 218 of internal pressure $P_I$ provides pressure (e.g., gas pressure) to second pressure zone 202 through second conduit 226. Second conduit 226 may pass through second die 182 and second insert 146, as illustrated in FIG. 6, or may pass through first die 180 and first insert 144. Second conduit 226 is coupled to and in fluid communication with panel pressurization port 126.

Source 220 of vacuum pressure $P_V$ provides pressure (e.g., vacuum pressure) to third pressure zone 204 through third conduit 228. Third conduit 228 may pass through first die 180 and first insert 144, as illustrated in FIG. 6, or may pass through second die 182 and second insert 146. Third conduit 228 is coupled to and in fluid communication with outer caul plate assembly pressurization port 224.

Figure 8:
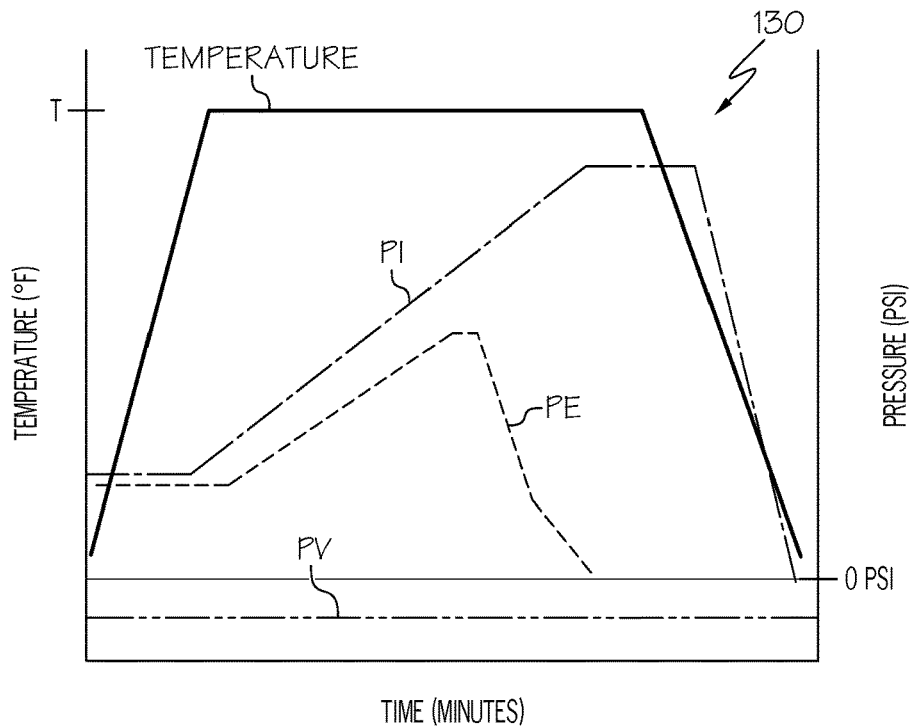
FIG. 8 is one example of a pressure profile used to form the panel of FIG. 3.
Figure 9:
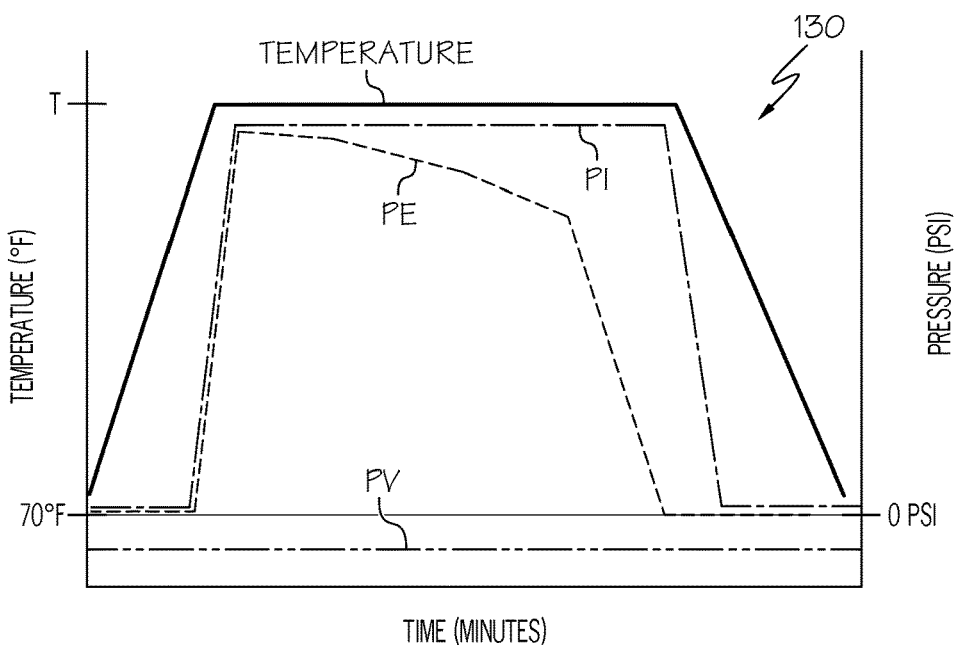
FIG. 9 is another example of a pressure profile used to form the panel of FIG. 3.

Referring to FIGS. 8 and 9, and with reference to FIG. 7, first pressure zone 200, second pressure zone 202 and third pressure zone 204 may be pressurized using a tailored pressure profile 130 to form panel 102 once precursor panel 110 is heated to a superplastic temperature T. Pressure profile 130 illustrated in FIGS. 8 and 9 show examples of the interrelation between superplastic temperature T, internal pressure $P_I$, external pressure $P_E$, and vacuum pressure $P_V$ over time.

FIG. 8 shows one example of pressure profile 130 used during the pressurization step of the panel forming operation. Precursor panel 110 is heated by heating system 186 (e.g., induction coils 142) to superplastic temperature T. Once heated to superplastic temperature T, internal pressure $P_I$ is applied to second pressure zone 202 to begin pushing first face sheet 104 and second face sheet 106 (FIG. 4) apart. External pressure $P_E$ is then applied to first pressure zone 200 prior to internal pressure $P_I$ reaching a maximum pressure to push inner caul plate assembly 196 (FIG. 7) into surface contact with first face sheet 104 and second face sheet 106. External pressure $P_E$ is less than internal pressure $P_I$ throughout the process. External pressure $P_E$ is then removed and internal pressure $P_I$ is maintained to finish forming panel 102. Internal pressure $P_I$ is then removed while panel 102 is cooled. Vacuum pressure $P_V$ is maintained throughout the process.

FIG. 9 shows one example of pressure profile 130 used during the pressurization step of the panel forming operation. Precursor panel 110 is heated by heating system 186 (e.g., induction coils 142) to superplastic temperature T. Once heated to superplastic temperature T, internal pressure $P_I$ is applied to second pressure zone 202 to push first face sheet 104 and second face sheet 106 (FIG. 4) apart and external pressure $P_E$ is applied to first pressure zone 200 to push inner caul plate assembly 196 (FIG. 7) into surface contact with first face sheet 104 and second face sheet 106. External pressure $P_E$ is then removed and internal pressure $P_I$ is maintained to finish forming panel 102. Internal pressure $P_I$ is then removed. Panel 102 is then cooled. Vacuum pressure $P_V$ is maintained throughout the process.

Referring generally to FIG. 2, and particularly to FIGS. 5 and 6, in one example construction, heating system 186 is an inductive heating system. As one example, induction coils 142 are positioned adjacent to forming cavity 184. A plurality of induction coils 142 may extend longitudinally through the length of first tool 132 adjacent to forming cavity 124 (e.g., first portion 176 of forming cavity 124) and through the length of second tool 134 adjacent to forming cavity 124 (e.g., second portion 178 of forming cavity 124). As one example, induction coils 142 may be embedded within and extend through an interior of first tool 132 and second tool 134.

Referring to FIGS. 5 and 6, as one example, each induction coil 142 is formed from straight tubing sections 152 that extend along the length of each of first tool 132 and second tool 134 and flexible coil connectors 154 that join the straight tubing sections 152 in first tool 132 to the straight tubing sections 152 in second tool 134.

Induction coils 142 are connected to an external power source, for example, coil driver 156 (FIG. 6), and to a source of coolant (not explicitly illustrated) by connectors 174 (FIG. 5) located at the ends of inductive coils 142. Induction coils 142 also remove thermal energy by serving as a conduit for a coolant fluid, such as water. As one example, four separate induction coils 142 may be used. However, other numbers of induction coils 142 may also be used without limitation.

In the inductive heating example, first die 180 and second die 182 are made from a material that is not susceptible to inductive heating. As one example, first die 180 and second die 182 may be made of a ceramic material. As one example, first die 180 and second die 182 may be made of a composite material. A composite or ceramic material that has a low coefficient of thermal expansion, is thermal shock resistant, and has relatively high compression strength may be preferred, such as a castable fused silica ceramic. As one example, interior 166 of first die 180 and second die 182 is formed of a castable phenolic or ceramic and the exterior sides of the toolboxes are formed from precast composite phenolic resin blocks 168.

First insert 144 and second insert 146 may be made from a material that is susceptible to inductive heating (e.g., a ferromagnetic material). As one example, first insert 144 and second insert 146 are formed of stainless steel (e.g., 420 stainless steel). Alternatively, first insert 144 and second insert 146 may be made from a material that is not susceptible to inductive heating (e.g., a non-ferromagnetic material). As one example, first insert 144 and second insert 146 are formed of a castable dielectric phenolic or ceramic.

Inner caul plate assembly 196 (e.g., first inner caul plate 206 and second inner caul plate 208) and/or outer caul plate assembly 198 (e.g., first outer caul plate 210 and second outer caul plate 212) may be made from a material that is susceptible to inductive heating (e.g., a ferromagnetic material). As one example, inner caul plate assembly 196 and/or outer caul plate assembly 198 are formed from metal. As one general, non-limiting example, inner caul plate assembly 196 and/or outer caul plate assembly 198 may be formed from metal sheets. As one specific, non-limiting example, inner caul plate assembly 196 and/or outer caul plate assembly 198 may be formed from stainless steel (e.g., 420 stainless steel). Alternately, inner caul plate assembly 196 and/or outer caul plate assembly 198 may be made from a material that is not susceptible to inductive heating (e.g., a non-ferromagnetic material), such as a composite material.

Referring to FIG. 6, as one example, first tool 132 includes first (e.g., upper) susceptor liner 188 positioned within first insert cavity 158 between first die 180 and first insert 144. Second tool 134 includes second (e.g., lower) susceptor liner 190 positioned within second insert cavity 160 between second die 182 and second insert 146. First susceptor liner 188 and second susceptor liner 190 surround first insert 144 and second insert 146 and forming cavity 124. First susceptor liner 188 and second susceptor liner 190 may be made from a material that is susceptible to inductive heating (e.g., a ferromagnetic material).

As one example, first susceptor liner 188 and second susceptor liner 190 may include a layer, or sheet, of magnetically permeable material positioned along the inside surface of first insert cavity 158 and second insert cavity 160, respectively. Magnetically permeable materials for constructing the first susceptor liner 188 and second susceptor liner 190 may include ferromagnetic materials that have at least an approximately 10-fold decrease in magnetic permeability when heated to a temperature higher than a critical, or Curie, temperature. Such a large drop in permeability at the critical temperature promotes temperature control of first susceptor liner 188 and second susceptor liner 190 and, as a result, temperature control of the panel (e.g., panel 102) being formed. Ferromagnetic materials may include the five elements iron (Fe), cobalt (Co), nickel (Ni), gadolinium (Gd), and dysprosium (Dy), and alloys of those elements.

As one example, first susceptor liner 188 and second susceptor liner 190 may be a thermally sprayed, smart susceptor that includes a mesh structure supporting a magnetically permeable, thermally sprayed material and optionally including a nickel aluminide coating (not explicitly illustrated). The mesh structure may be a wire mesh constructed of stainless steel, or of a metal having the same composition as the thermally sprayed material that can withstand the temperature and other environmental factors associated with heating and forming of panel 102. The mesh structure provides a skeleton, or support structure, that holds together the sprayed material. As one example, the wire mesh structure is a very flexible mesh weave that can closely drape to the shape of first insert cavity 158 and second insert cavity 160. As one specific, non-limiting example, the mesh structure includes an approximately 0.020 inch (0.5 millimeter) thick, 300 series stainless steel wire. Further, the mesh structure may have sufficiently sized interstices between its wires to allow interdigitation of the sprayed material within the mesh structure, while at the same time providing support for the sprayed material. Preferably, the opening size of the mesh is approximately five times the wire diameter. For instance, an approximately 0.020 inch (0.5 millimeter) wire would have an approximately 0.100 inch (2.54 millimeter) mesh opening.

Induction coil 142 is configured to generate an electromagnetic flux (e.g., a magnetic field) that causes heating of materials susceptible to inductive heating. As one example, induction coil 142 generates the electromagnetic flux that causes heating of first susceptor liner 188 and second susceptor liner 190. First susceptor liner 188 and second susceptor liner 190 create an electromagnetic shield that prevents other components formed from a material susceptible to inductive heating that are surrounded by first susceptor liner 188 and second susceptor liner 190 (e.g., interior components) from heating due to the electromagnetic flux. Once heated through inductive heating, first susceptor liner 188 and second susceptor liner 190 heat the interior components through conduction and/or radiation. As one example, first susceptor liner 188 and second susceptor liner 190 shield first insert 144, second insert 146, inner caul plate assembly 196 (e.g., first inner caul plate 206 and second inner caul plate 208), outer caul plate assembly 198 (e.g., first outer caul plate 210 and second outer caul plate 212) and panel 102 (i.e., interior components) from the electromagnetic flux and, thus, prevent those components from being heated through induction. The interior components have a Curie point lower than first susceptor liner 188 and second susceptor liner 190.

The process of heating panel 102 includes inserting precursor panel 110, into forming cavity 124 defined by first insert 144 and second insert 146 and between first susceptor liner 188 and second susceptor liner 190 supported within first insert cavity 158 and second insert cavity 160. First die 180 and second die 182 are then brought together until precursor panel 110 is enclosed within forming cavity 124 and forming cavity 124 is sealed. Coil driver 156 supplies a predetermined amount of power to induction coils 142 causing an oscillating current in induction coils 142 that generates the oscillating electromagnetic flux (not explicitly illustrated). The electromagnetic flux travels directly through first die 180 and first insert 144 and second die 182 and second insert 146 due to their lack of magnetic permeability (e.g., not susceptible to inductive heating) and couple with the magnetically permeable material (e.g., susceptible to inductive heating) of first susceptor liner 188 and second susceptor liner 190. Coupling with the electromagnetic flux induces eddy currents in first susceptor liner 188 and second susceptor liner 190, which, in turn, results in the generation of heat. First susceptor liner 188 and second susceptor liner 190 block the electromagnetic flux from the interior of forming cavity 194. The heat increases the temperature of first susceptor liner 188 and second susceptor liner 190 that, being adjacent to precursor panel 110 trapped within forming cavity 124, results in a temperature increase of precursor panel 110.

In constructions where only first susceptor liner 188 and second susceptor liner 190 are formed from a material that is susceptible to inductive heating, the heat generated by first susceptor liner 188 and second susceptor liner 190 may be transferred to first insert 144, second insert 146, inner caul plate assembly 196, outer caul plate assembly 198 and/or precursor panel 110 through conduction and/or radiation. As described above, in constructions where one or more interior components (e.g., one or more of first insert 144, second insert 146, inner caul plate assembly 196, outer caul plate assembly 198 and/or precursor panel 110) are formed from a material that is susceptible to inductive heating, first susceptor liner 188 and second susceptor liner 190 will shield those components from inductive heating and will transfer heat to those components through conduction and/or radiation.

An oscillating electrical current in induction coil 142 produces a time varying magnetic field that heats first susceptor liner 188 and second susceptor liner 190 via eddy current heating. The frequency at which coil driver 156 drives induction coil 142 depends upon the nature of panel 102 (or precursor panel 110). As one example, induction coil 142 may be powered with up to about 400 kW at frequencies of between about 3-10 kHz.

The shape of induction coil 142 may have an effect upon magnetic field uniformity. Field uniformity is usually important because temperature uniformity induced in panel 102 (or precursor panel 110) is directly related to the uniformity of the magnetic field. Uniform heating ensures that different portions of the panel will reach an appropriate panel forming temperature at approximately the same time. As one example, solenoid type induction coils provide a uniform magnetic field, and, thus, may be preferred. Greater field uniformity is produced in the panel that is located symmetrically along a centerline of the surrounding induction coil 142. Those skilled in the art can establish series/parallel induction coil combinations, variable turn spacing, and distances between the panel and the induction coil by standard electrical calculations to achieve the desired heating from whatever coil configuration is used.

Referring to FIG. 6, each of first die 180 and second 182 surrounds and supports the respective first insert 144 and second 146 and first susceptor liner 188 and second susceptor liner 190. Each die 180 and 182 also holds straight tubing sections 152 of induction coils 142 in proper position in relationship to first susceptor liner 188, second susceptor liner 190 and first insert 144 and second insert 146 defining forming cavity 124. As one example, straight tubing sections 152 of induction coils 142 are embedded (e.g., cast) within first die 180 and second die 182, and extend parallel to the respective first insert 144 and second insert 146. Alternatively, induction coil 142 may be contained within first insert 144 and second insert 146.

First die 180 and second die 182 are usually substantially thermally insulating and trap and contain heat within forming cavity 124. Since the dies are not inductively heated and act as insulators to maintain heat within the forming cavity, less energy may be required to achieve the desired operating temperature.

Referring to FIGS. 5 and 6, in one example construction, both first tool 132 and second tool 134 are reinforced with a plurality of fiberglass rods 148. Fiberglass rods 148 may extend both longitudinally and/or transversely in a grid through each of first tool 132 and second tool 134 to increase the strength of the tools 132 and 134. As one example, fiberglass rods 148 extend both longitudinally and transversely through blocks 168 and interior 166 of first die 180 and second die 182. After casting interior 166 of first die 180 and second die 182, fiberglass rods 148 may be post-tensioned through the use of tensioning nuts 170. Post-tensioning fiberglass rods 148 maintains a compressive load on blocks 168, interior 166 and inserts 144 and 146 to maintain the tolerances of inserts 144 and 146 and to prevent cracking or damage of dies 180 and 182 and/or inserts 144 and 146 during the panel-forming operations or processes.

Referring to FIG. 10, and with reference to FIGS. 2-7, one embodiment of method 500 for forming panel 102 including first face sheet 104, second face sheet 106 and core sheet 108 between first face sheet 104 and second face sheet 106 is disclosed. Modifications, additions, or omissions may be made to method 500 without departing from the scope of the present disclosure. Method 500 may include more, fewer, or other steps. Additionally, steps may be performed in any suitable order.

Generally, during a panel forming operation (e.g., method 500), precursor panel 110 is placed within forming cavity 124. Precursor panel 110 is heated to superplasticity temperature T by heating system 186. When precursor panel 110 reaches a superplastic state, panel volume 122 is pressurized to push first face sheet 104 and second face sheet 106 apart from each other and form a corrugated-like core sheet 108 intercoupled therebetween. Cavity volume 194 is pressurized to control the shape of exterior surfaces 128 of panel 102 (e.g., of first face sheet 104 and second face sheet 106), thus, preventing surface imperfections.

As one specific example, in accordance with apparatus 100, during the panel forming operation (e.g., method 500), precursor panel 110 is sealed within inner caul plate assembly 196 and inner caul plate assembly 196 and precursor panel 110 are sealed within outer caul plate assembly 198. The sealed assembly of precursor panel 110, inner caul plate assembly 196 and outer caul plate assembly 198 is placed within forming cavity 124 between first insert 144 and second insert 146. Precursor panel 110 is heated to superplasticity temperature T by heating system 186 (e.g., by energizing induction coils 142). When precursor panel 110 reaches a superplastic state, internal pressure $P_I$ is applied to an interior of precursor panel 110 (e.g., to second pressure zone 202) to push first face sheet 104 and second face sheet apart from each other and form a corrugated-like core sheet 108 intercoupled therebetween. External pressure $P_E$ is applied between outer caul plate assembly 198 and inner caul plate assembly 196 (e.g., to first pressure zone 200) to push inner caul plate assembly 196 against first face sheet 104 and second face sheet 106 (e.g., exert a pressure to an exterior of precursor panel 110) to prevent formation of surface imperfections, for example, about weld joints, as first face sheet 104 and second face sheet 106 push apart. Vacuum pressure $P_V$ is applied between inner caul plate assembly 196 and first face sheet 104 and second face sheet 106 (e.g., to third pressure zone 204) to maintain inner caul plate assembly 196 in engagement with first face sheet 104 and second face sheet 106.

In one example implementation, method 500 includes the step of entrapping precursor panel 110 within forming cavity 124 of molding tool 116, as shown at block 502. As used herein, the term entrapping generally refers to securing an article (e.g., precursor panel 110) between two components (e.g., first tool 132 and second tool 134) and enclosing the article within a cavity (e.g., forming cavity 124) formed by the two components. Precursor panel 110 includes first face sheet 104, core sheet 108 welded to first face sheet 104 and second face sheet 106 welded to core sheet 108.

As one example, forming cavity 124 may be formed by first portion 176 defined by first insert 144 coupled to first die 180 of first tool 132 and second portion 178 defined by second insert 146 coupled to second die 182 of second tool 134.

In one example implementation, method 500 includes the step of sealing precursor panel 110 within inner caul plate assembly 196 positioned within forming cavity 124, as shown at block 504. As used herein, the term sealing generally refers to encapsulating an article (e.g., precursor panel 110) between two components (e.g., first inner caul plate 206 and second inner caul plate 208) such that the two components form a sealed envelope around the article.

In one example implementation, method 500 includes the step of sealing inner caul plate assembly 196 and precursor panel 110 within outer caul plate assembly 198 positioned within forming cavity 124, as shown at block 506.

As one example, precursor panel 110 is sealed within inner caul plate assembly 196. The combination of precursor panel 110 and inner caul plate assembly 196 is then sealed within outer caul plate assembly 198. The combination of precursor panel 110, inner caul plate assembly 196, and outer caul plate assembly 198 is then entrapped within forming cavity 124 of molding tool 116.

In one example implementation, method 500 includes the step of heating precursor panel 110 to a superplastic temperature T, as shown at block 508.

In one example implementation, the step of heating precursor panel 110 (block 508) includes inductively heating precursor panel 110, as shown at block 510.

In one example implementation, the step of inductively heating precursor panel 110 (block 510) includes generating an electromagnetic flux (e.g., a magnetic field) from induction coils 142 embedded within tool 116 adjacent to forming cavity 124, as shown at block 512. The step of inductively heating precursor panel 110 (block 510) further includes inductively heating first susceptor liner 188 and second susceptor liner 190 lining forming cavity 124, as shown at block 514. First susceptor liner 188 and second susceptor liner 190 are formed from a material susceptible to inductive heating. The step of inductively heating precursor panel 110 (block 510) further includes conductively heating precursor panel 110 from heat generated by first susceptor liner 188 and second susceptor liner 190, as shown at block 516.

In one example implementation, method 500 includes the step of pressurizing panel volume 122 defined between first face sheet 104 and second face sheet 106 of precursor panel 110 by, for example, using pressurization system 192, as shown at block 518.

In one example implementation, method 500 includes the step of pressurizing cavity volume 194 defined between tool 116 and precursor panel 110 by, for example, using pressurization system 192, as shown at block 520.

In one example implementation, the step of pressurizing panel volume 122 (block 518) includes pressurizing second pressure zone 202 defined between first face sheet 104 and second face sheet 106 of precursor panel 110 by, for example, using source of internal pressure $P_I$ 218 of pressurization system 192, as shown at block 522.

In one example implementation, the step of pressurizing cavity volume 194 (block 520) includes pressurizing first pressure zone 200 defined between inner caul plate assembly 196 and outer caul plate assembly 198 by, for example, using source of external pressure $P_E$ 216 of pressurization system 192, as shown at block 524.

In one example implementation, the step of pressurizing cavity volume 194 (block 520) further comprises pressurizing third pressure zone 204 defined between inner caul plate assembly 196 and first face sheet 104 and second face sheet 106 by, for example, using source of vacuum pressure $P_V$ 220 of pressurization system 192, as shown at block 526.

In one example implementation, method 500 includes the step of pushing first face sheet 104 and second face sheet 106 apart from each other in response to pressurization of second pressure zone 202, as shown at block 528.

In one example implementation, method 500 includes the step of pushing inner caul plate assembly 196 against first face sheet 104 and second face sheet 106 in response to pressurization of first pressure zone 200, as shown at block 530.

In one example implementation, method 500 includes the step of pulling inner caul plate assembly 196 against first face sheet 104 and second face sheet 106 in response to pressurization of third pressure zone 204, as shown at block 532.

Examples of the present disclosure may be described in the context of aircraft manufacturing and service method 1100 as shown in FIG. 11 and aircraft 1200 as shown in FIG. 12.

During pre-production, the illustrative method 1100 may include specification and design, as shown at block 1102, of aircraft 1200 and material procurement, as shown at block 1104. During production, component and subassembly manufacturing, as shown at block 1106, and system integration, as shown at block 1108, of aircraft 1200 may take place. As one example, method 500 (FIG. 10) may occur during component and subassembly manufacturing (block 1106). Thereafter, aircraft 1200 may go through certification and delivery, as shown block 1110, to be placed in service, as shown at block 1112. While in service, aircraft 1200 may be scheduled for routine maintenance and service, as shown at block 1114. Routine maintenance and service may include modification, reconfiguration, refurbishment, etc. of one or more systems of aircraft 1200.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 12, aircraft 1200 produced by illustrative method 1100 may include airframe 1202 with a plurality of high-level systems 1204 and interior 1206. Examples of high-level systems 1204 include one or more of propulsion system 1208, electrical system 1210, hydraulic system 1212 and environmental system 1214. As one example, panel 102 may be used in airframe 1202 of aircraft 1200. Any number of other systems may be included. Although an aerospace example is shown, the principles disclosed herein may be applied to other industries, such as the automotive industry, the marine industry, the construction industry or the like.

The systems, apparatus and methods shown or described herein may be employed during any one or more of the stages of the manufacturing and service method 1100. For example, components or subassemblies corresponding to component and subassembly manufacturing (block 1106) may be fabricated or manufactured in a manner similar to components or subassemblies produced while aircraft 1200 is in service (block 1112). Also, one or more examples of the apparatus, systems and methods, or combination thereof may be utilized during production stages (blocks 1108 and 1110. Similarly, one or more examples of the apparatus and methods, or a combination thereof, may be utilized, for example and without limitation, while aircraft 1200 is in service (block 1112) and during maintenance and service stage (block 1114).

Although various embodiments of the disclosed apparatus and method have been shown and described, modifications may occur to those skilled in the art upon reading the specification. The present application includes such modifications and is limited only by the scope of the claims.

What is claimed is:

1. A method for forming a panel comprising a first face sheet, a second face sheet and a core sheet between said first face sheet and said second face sheet, said method comprising:

entrapping a precursor panel within a forming cavity of a molding tool, said precursor panel comprising said first face sheet, said core sheet welded to said first face sheet and said second face sheet welded to said core sheet, and at least one caul plate being positioned within said forming cavity adjacent to said precursor panel;

heating said precursor panel to a superplastic temperature;

pressurizing a first pressure zone located between said molding tool and said caul plate to press caul plate against said precursor panel; and pressurizing a panel volume defined between said first face sheet and said second face sheet of said precursor panel.

2. The method of claim 1 further comprising:

sealing said precursor panel within an inner caul plate assembly within said forming cavity, said inner caul plate assembly including said caul plate that is positioned within said forming cavity adjacent to said precursor panel; and sealing said inner caul plate assembly within an outer caul plate assembly within said forming cavity, wherein:

said first pressure zone is defined between said inner caul plate assembly and said outer caul plate assembly, and the step of pressurizing said panel volume comprises pressurizing a second pressure zone defined between said first face sheet and said second face sheet of said precursor panel.

3. The method of claim 2 further comprising:

pushing said inner caul plate assembly against said first face sheet and said second face sheet in response to pressurization of said first pressure zone; and pushing said first face sheet and said second face sheet apart from each other in response to pressurization of said second pressure zone, wherein said inner caul plate assembly defines a forming surface shaped to correspond to a formed shape of said first face sheet and said second face sheet of said panel.

4. The method of claim 3 wherein a pressure of said second pressure zone is greater than a pressure of said first pressure zone.

5. The method of claim 3 wherein the step of pressurizing said cavity volume further comprises pressurizing a third pressure zone defined between said inner caul plate assembly and said first face sheet and said second face sheet.

6. The method of claim 5 further comprising pulling said inner caul plate assembly against said first face sheet and said second face sheet in response to pressurization of said third pressure zone.

7. The method of claim 2 wherein the step of heating said precursor panel comprises inductively heating said precursor panel.

8. The method of claim 7 wherein the step of inductively heating said precursor panel comprises:

generating an electromagnetic flux from induction coils embedded within said tool adjacent to said forming cavity;

inductively heating a first susceptor liner and a second susceptor liner lining said forming cavity, wherein said first susceptor liner and said second susceptor liner are formed from a material susceptible to inductive heating; and conductively heating said precursor panel from heat generated by said first susceptor liner and said second susceptor liner.

9. The panel formed by the method of claim 1, the panel comprising:

a first face sheet;

a second face sheet spaced apart from said first face sheet; and a core sheet intercoupled between said first face sheet and said second face sheet,
wherein said panel is formed by:
  entrapping a precursor panel within a forming cavity of a molding tool, said precursor panel comprising said first face sheet, said core sheet welded to said first face sheet and said second face sheet welded to said core sheet, at least one caul plate being positioned within said forming cavity adjacent to said precursor panel;
  heating said precursor panel to a superplastic temperature;
  pressurizing a first pressure zone located between said molding tool and said caul plate to press caul plate against said precursor panel; and
  pressurizing a panel volume defined between said first face sheet and said second face sheet of said precursor panel.

10. An apparatus for forming the panel in accordance with the method of claim 1, said apparatus comprising:
  a molding tool defining a forming cavity shaped to correspond to said panel;
  at least one caul plate positioned within said forming cavity;
  a heating system positioned adjacent to said forming cavity and configured to heat said forming cavity; and
  a pressurization system configured to pressurize a a first pressure zone located between said molding tool and said caul plate and pressurize a panel volume between said first face sheet and said second face sheet.

11. The apparatus of claim 10 further comprising:
  an outer caul plate assembly positioned within said forming cavity adjacent to said tool; and
  an inner caul plate assembly positioned within said forming cavity between said outer caul plate assembly and said panel, said inner caul plate assembly including said caul plate that is positioned within said forming cavity adjacent to said precursor panel;
  wherein said pressurization system is configured to:
    pressurize the first pressure zone defined between said inner caul plate assembly and said outer caul plate assembly; and
    pressurize a second pressure zone defined between said first face sheet and said second face sheet.

12. The apparatus of claim 11 wherein pressurization of first pressure zone pushes said inner caul plate assembly against said first face sheet and said second face sheet, and wherein pressurization of said second pressure zone pushes said first face sheet and said second face sheet apart from each other.

13. The apparatus of claim 12 wherein said inner caul plate assembly defines a forming surface shaped to correspond to a formed shape of said first face sheet and said second face sheet.

14. The apparatus of claim 12 wherein a pressure of said second pressure zone is greater than a pressure of said first pressure zone.

15. The apparatus of claim 12 wherein said pressurization system is configured to pressurize a third pressure zone defined between said inner caul plate assembly and said first face sheet and said second face sheet.

16. The apparatus of claim 15 wherein pressurization of third pressure zone pulls said inner caul plate assembly against said first face sheet and said second face sheet.

17. The apparatus of claim 11 wherein said tool comprises:
  a first die comprising a first insert cavity;
  a first insert coupled to said first die within said first insert cavity, wherein said first insert defines a first portion of said forming cavity;
  a second die comprising a second insert cavity; and
  a second insert coupled to said second die within said second insert cavity, wherein said second insert defines a second portion of said forming cavity.

18. The apparatus of claim 17 wherein said heating system comprises an induction coil embedded within said first die adjacent to said first insert and embedded within said second die adjacent to said second insert, and wherein said die is formed from a material not susceptible to inductive heating.

19. The apparatus of claim 18 further comprising:
  a first susceptor liner positioned within said first insert cavity between said first die and said first insert; and
  a second susceptor liner positioned within said second insert cavity between said second die and said second insert,
  wherein said first susceptor liner and said second susceptor liner are formed from a material susceptible to inductive heating.

20. The apparatus of claim 19 wherein at least one of said inner caul plate assembly and said outer caul plate assembly are formed from a material susceptible to inductive heating, and wherein said first susceptor liner and said second susceptor liner shield said inner caul plate assembly and said outer caul plate assembly from inductive heating.

* * * * *